United States Patent [19]

Schwingshandl

[11] 3,746,116
[45] July 17, 1973

[54] AIR CUSHION VEHICLE

[76] Inventor: John Schwingshandl, 7 King St., Georgetown, Ontario, Canada

[22] Filed: June 14, 1971

[21] Appl. No.: 152,573

[52] U.S. Cl. .............................................. 180/121
[51] Int. Cl. ............................................ B60v 1/12
[58] Field of Search .................... 180/116, 117, 118, 180/120, 121, 128

[56] References Cited
UNITED STATES PATENTS

| | | | |
|---|---|---|---|
| 3,219,134 | 11/1965 | Bratt | 180/121 |
| 3,379,271 | 8/1968 | Hopkins | 180/128 |
| 3,373,837 | 3/1968 | Guienne | 180/121 |
| 3,362,495 | 1/1968 | Lagey | 180/117 |
| 3,392,800 | 7/1968 | Swamy | 180/117 |
| 3,466,010 | 9/1969 | Jung | 180/121 |
| 3,438,457 | 4/1969 | Guienne | 180/121 |

*Primary Examiner*—Gerald M. Forlenza
*Assistant Examiner*—D. W. Keen
*Attorney*—Sim & McBurney

[57] ABSTRACT

An air cushion vehicle is constructed with a plurality of sub-chambers from which air flows to form the cushion. Air is passed independently to each of the sub chambers from a source of air. Valves are provided to selectively control the flow of air to the sub-chambers so that banked turning may be achieved. A reversing mechanism and a simple control system are described.

11 Claims, 5 Drawing Figures

Patented July 17, 1973  3,746,116

3 Sheets-Sheet 1

INVENTOR.
JOHN SCHWINGSHANDL
BY

INVENTOR.
JOHN SCHWINGSHANDL

INVENTOR.
JOHN SCHWINGSHANDL.

AIR CUSHION VEHICLE

This invention relates to air cushion vehicles, more particularly to an air cushion vehicle control system.

Air cushion vehicles are known and generally include a platform which support the vehicle superstructure and a flexible, inflatable skirt surrounds and depends from the platform. The skirt and the platform define a chamber beneath the platform which receives air and cushions the platform from the surface over which the vehicle travels.

Motive force is applied to the vehicle in any convenient manner, and the vehicle moves over the surface supported on the air cushion.

The air cushion vehicles commercially produced and operated have been of a large size, carrying a number of passengers or a large freight load. Such vehicles are stable and operate efficiently. Small air cushion vehicles have not been successfully produced due to stability and control problems.

The present invention provides an air cushion vehicle which is stable, is able to operate over a variety of ground surfaces, such as soil, snow and water, and may accommodate as few as one person. Further, the vehicle is easily operated with safety.

Figure 1:
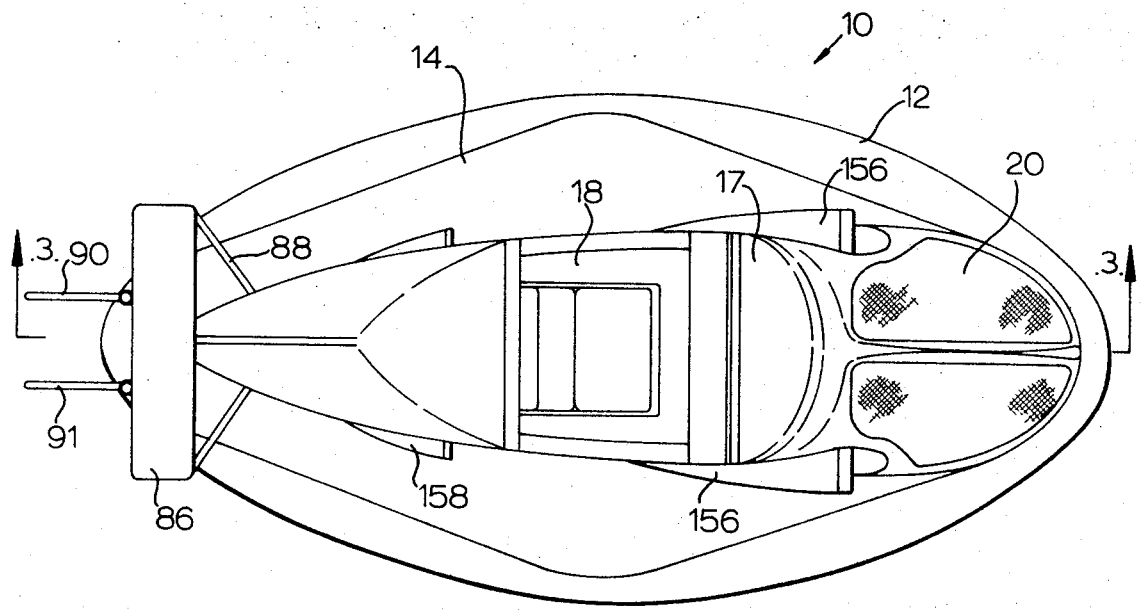
Figure 4:
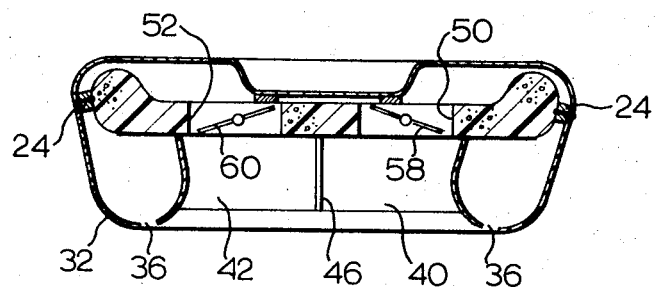
Figure 2:
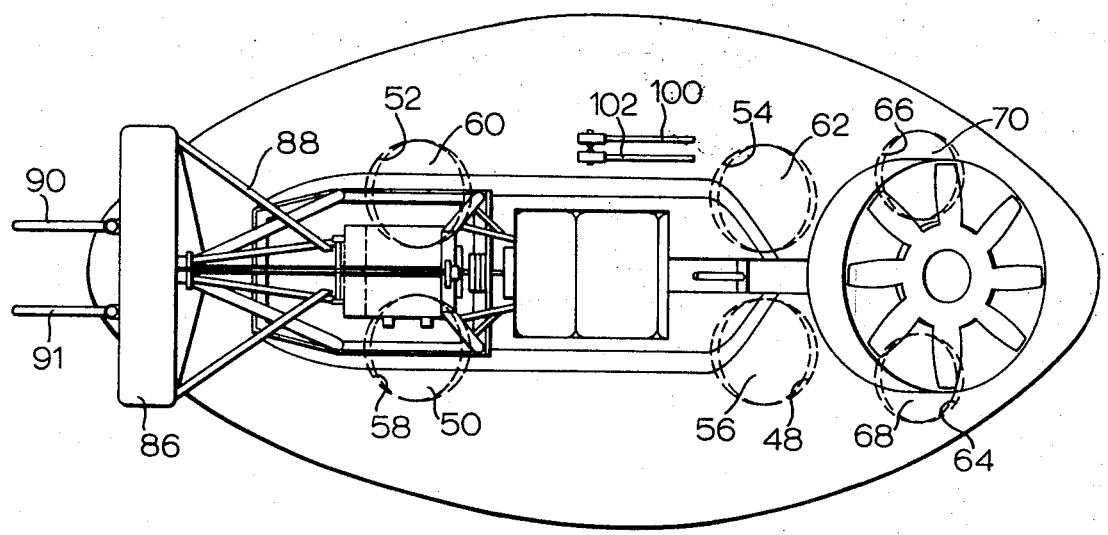
Figure 3:
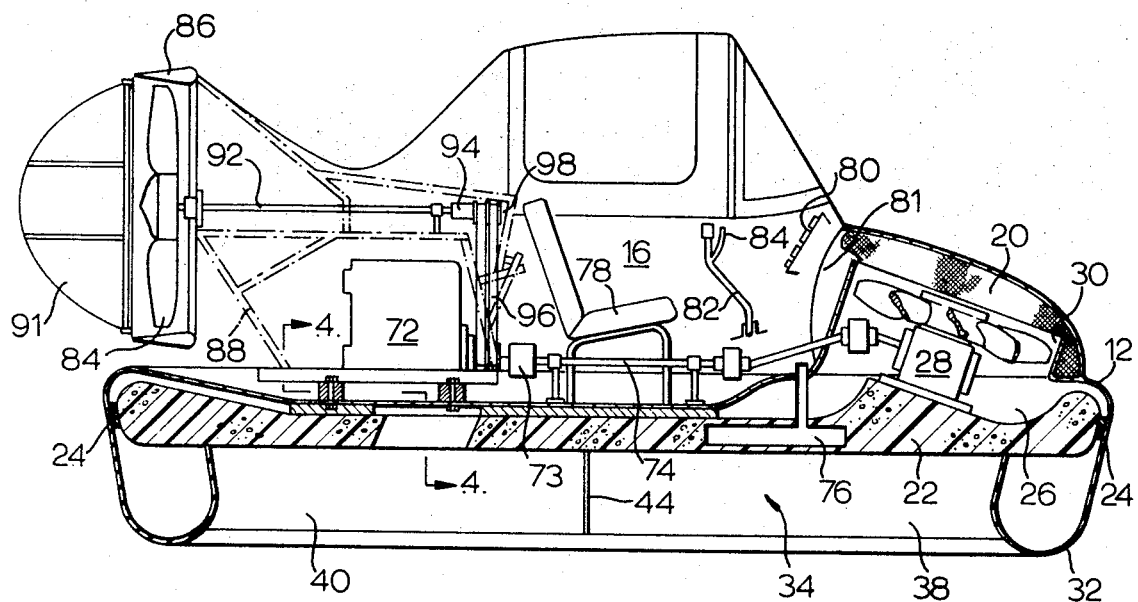
Figure 5:
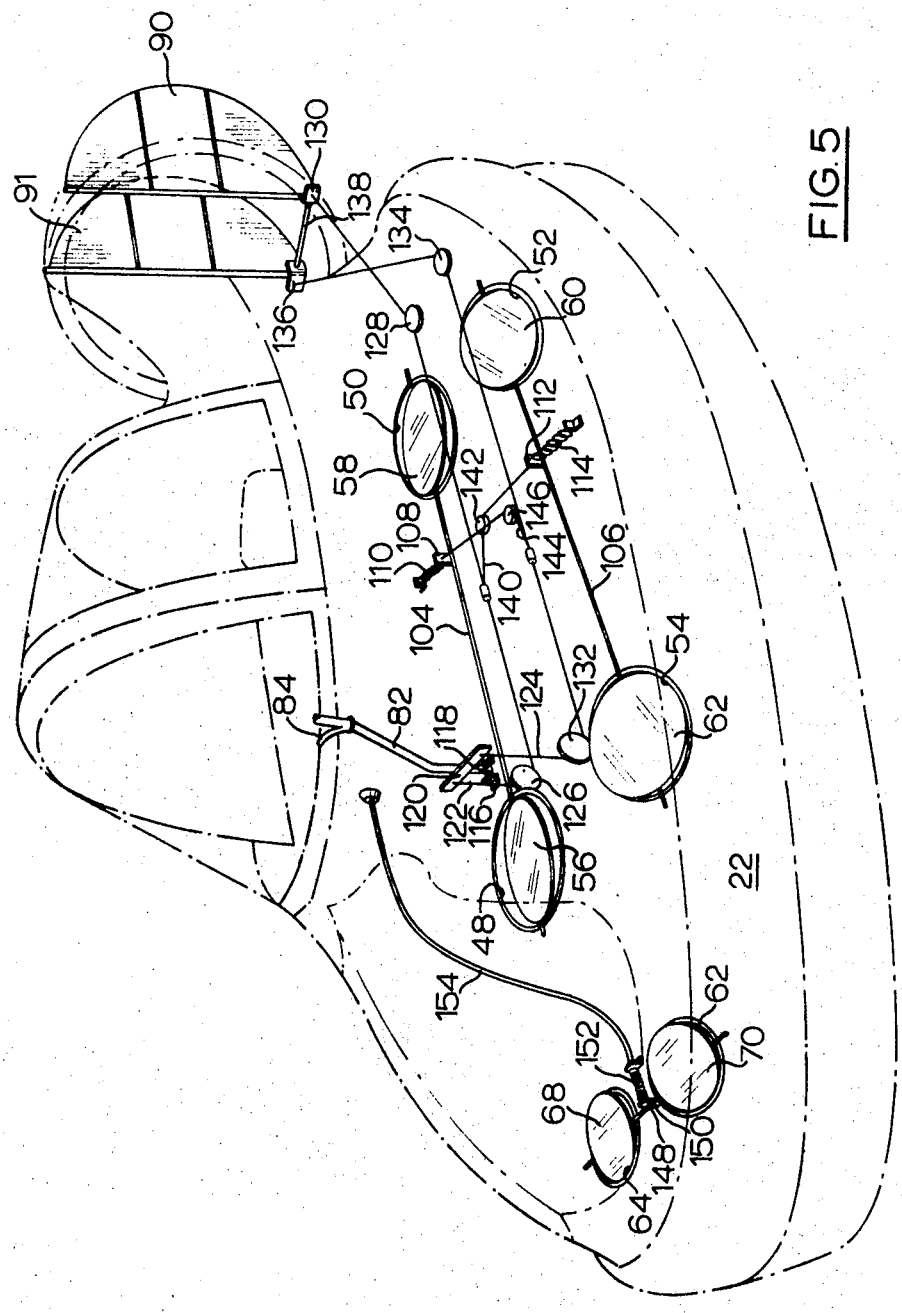

The invention is illustrated by the accompanying drawings in which:

FIG. 1 is a top elevation of an air cushion vehicle in accordance with one embodiment of the invention, FIG. 2 is the top elevation of FIG. 1 with parts removed, FIG. 3 is a section along 3—3 of FIG. 1, FIG. 4 is a section along 4—4 of FIG. 3, FIG. 5 is a perspective view of the control system of the vehicle of FIG. 1.

An air cushion vehicle 10 is formed with a generally elliptical shaped shell 12. The shell 12 may be of any convenient shape depending on the type of vehicle used. With the single seater vehicle 10 illustrated, the generally elliptical shape for the shell 12 is preferred. The shell 12 may be constructed of any convenient material, such as aluminium or fiberglass. The latter material is preferred because of its lightness and cheapness.

A canopy or superstructure 14 defines a cabin or cockpit 16 within which the operator of the vehicle is located. The canopy 14 includes a windshield 17 and a sliding cockpit cover 18.

The canopy 14 may be constructed of any convenient material and it is preferred to mold the canopy from fiberglass material.

The windshield 17 may be constructed of any desired transparent material, but it is preferred for reasons of safety to construct the windshield 17 of relatively unbreakable material, such as plexiglass. The movable cover 18 generally includes transparent portions to enable the driver to look out of the sides of the vehicle 10 and these transparent portions similarly may be constructed of plexiglass, or other convenient transparent material.

The canopy 14 includes a grill 20 which acts as a screen to the air intake of the vehicle.

As more particularly shown in FIGS. 2 and 3, the shell 12 is connected to a platform 22 and is spaced therefrom by a plurality of spacers 24 positioned around the periphery of the platform 14 and only four of which are shown.

The platform 22 may be formed of any desired material, preferably a buoyant material which will allow the vehicle 10 to float if the vehicle is positioned on water and the air cushion is not operating. The platform 22 also should be strong so as to support the weight of the superstructure. An example of a suitable material is a glass fiberfilled polyuethane foam.

The platform 22 defines with the shell 12 an air chamber 26 which serves as a source of air for the air cushion of the vehicle 10 as is more particularly described below. Air is forced into the air chamber 26 from external of the vehicle 10 through the screen 20 by a lift fan 28 mounted on the platform 22 with its blades positioned in a circular passageway 30 communicating with the chamber 26. The blades of the fan 28 may have an adjustable pitch, which may be locked in any desired position for maximum efficiency.

Affixed between the periphery of the shell 12 and the underside of the platform 22 is a closed skirt 32 which extends continuously around the platform 22. The closed skirt 32 is in air-communication with the air chamber 26 by the gap between the platform 22 and the shell 12. The closed skirt 32 is constructed of flexible material, such as rubber or rubberized fabric, and defines with the underside of the platform 22 an air cushion chamber 34.

The skirt 32 is secured to the periphery of the shell 12 and the underside of the platform 22 in any desired manner, such as adhesive or rivets.

A plurality of equally spaced pressure relief holes 36 are provided at the lower end of the skirt 32, only two of which are shown (FIG. 4.).

The air cushion chamber 34 is divided up into four sub-chambers, only three of which 38, 40 and 42 are shown by curtains 44 and 46 which are secured to and downwardly project from the underside of the platform 22 to a position above the external extremity of the skirt. The curtain 44 extends laterally of the chamber 34 and the curtain 46 extends longitudinally of the chamber 34.

The curtains 44 and 46 are secured to each other at their point of intersection and are secured to the inner external surface of the skirt 32. The curtains may be affixed to the underside of the platform, to each other and to the skirt 32 in any desired manner, such as by the use of an adhesive or rivets.

The curtains 44 and 46 extend downwardly from the platform 22 and terminate above the lower extremity of the skirt 32. It has been found that the downward projection of the curtains 44 and 46 should not exceed 1/7th of the width of the vehicle.

The sub-chambers therefore are separate and out of fluid communication with each other. The sub-chambers may be formed in any convenient manner, although the preferred manner is that illustrated. The use of a plurality of sub-chambers allows the vehicle 10 to be controlled and imparts stability during operation.

It is essential for the vehicle of the invention to have at least four sub-chambers. It is possible to employ more than four, such as in a large vehicle, and the plurality of sub-chambers may be divided into two separate groups, one located at the left hand side and the other at the right hand side of the vehicle.

It is not possible, in accordance with this invention, to use less than four sub-chambers. Stability and lift capability problems are encountered, if, say, two elongated chambers are employed. For example, if the vehicle is travelling over rough terrain, the lift capability of the vehicle could be lost at one particular obstacle. With four chambers, or more, the lift capability is maintained.

Further, a pivotal effect has been observed if a single or two sub-chambers are used, so that there is a tendency for the vehicle to rock, if the load is unbalanced, whereas this effect is stabilized by the use of four or more sub-chambers. Additionally, the use of four sub-chambers allows for the establishment of a reversing mechanism, as will be described below.

Although the closed skirt 32 described above may be replaced by a free hanging skirt attached to the platform 22, it has been found that the closed skirt arrangement illustrated provides enhanced stability over rough terrain. A flexible skirt is preferred over a rigid skirt since a rigid skirt requires a greater amount of air pressure to maintain the air cushion, requiring a greater fan area and the development of a greater horse power.

Four circular openings 48, 50, 52 and 54 are provided in the platform 22 which communicates respectively with the sub-chambers 38, 40, 42 and the unseen chamber. The openings 48, 50, 52 and 54 allow the passage of air from the air chamber 26 to its associated sub-chamber to provide an air cushion below the platform 22 on which the vehicle 10 can ride.

The openings may be formed through the platform in any configuration. For example, the axis of the cylindrical shape of the openings may be at right angles to the plane of the platform, or angled thereto. Typically, the openings maybe formed with the axis angled in the same direction as the air intake channel 30 at approximately the same angle of inclination to the plane of the platform 22. The axis of the openings may be angled to reduce the drag on the air flow and obtain a higher efficiency of air flow through the openings.

The flow of air from the air chamber 26 to the sub-chambers is controlled to provide a selective air pressure in each of the sub-chambers. This control may be achieved by the use of butterfly valves 56, 58, 60 and 62 located respectively in openings 48, 50, 52 and 54. The butterfly valves 56, 58, 60 and 62 may be positioned in the openings at any desired degree of opening so that the volume of flow of air from the air chamber 26 to the appropriate sub-chamber is controlled. The manner of control of the butterfly valves is more particularly described below with reference to FIG. 5.

Any other convenient manner of establishing fluid communication between the source of air pressure in air chamber 22 and each of the sub-chambers may be provided. Additionally, control of the flow of air from the air chamber 22 to the sub-chambers may be achieved in any other desired manner.

Two further circular openings 64 and 66 are situated in the platform 22 forwardly of the openings 48 and 58 and communicate respectively with sub-chamber 38 and the unseen sub-chamber. The openings 64 and 66 are in communication with the air chamber 22 and the flow of air therethrough is controlled by butterfly valves 68 and 70 respectively. The function of these further openings 64 and 66 is more particularly indicated below and the control of the butterfly valves 68 and 70 is described below with reference to FIG. 5. Openings 64 and 66 are generally of a smaller diameter than openings 48 and 58, although the relative dimension of these openings may be varied, as desired.

Any alternative means of establishing selective additional fluid communication between the air chamber 26 and the front sub-chambers may be employed.

The fan 28 is driven by an internal combustion engine 72, or other suitable power plant, through a manually operable clutch 73 and a drive shaft 74. A fuel tank 76 is provided embedded in the platform 22 to feed fuel to the fuel intake of the engine in any convenient manner, and usually is constructed of rigid fiberglass or other structurally strong material chemically resistant to the fuel employed. The fuel tank for the power plant 72 may be provided at any other convenient location as desired for the particular vehicle.

The engine 72 similarly may be positioned at any convenient location but preferably is situated behind the cockpit area 16 to maintain a proper balance in the vehicle 10. Any type of engine 72 may be used, and a two-stroke internal combusion engine usually is used when the vehicle is designed to operate with one or two persons.

The engine 72 usually is separated from the cockpit 16 of the vehicle 10 by a firewall, not shown, for reasons of safety. A seat 78 is positioned in the cockpit 16 and is secured to the platform 22 in any convenient manner.

The vehicle 10 is illustrated having a single seat 78 in the cockpit 16. It will be apparent, however, that the dimensions of the vehicle may be varied to provide any desired size of cockpit area to accommodate more than one passenger and cargo, as required.

Also positioned in the cockpit 16 is an instrument panel 80, which includes any desired instrumentation, such as a speedometer, fuel guage, ammeter, ignition and starter switches and light switches.

The cockpit 16 usually is sealed from the air intake duct 30 by a wall 81.

A vehicle control stick 82 having affixed thereto a throttle control 84 also is positioned in the cockpit 16 to enable an operator to control the motion of the vehicle 10 as more particularly described below with reference to FIG. 5.

A thrust fan 84 is mounted at the rear of the vehicle 10 for the purposes of imparting motion to the vehicle when it is supported on its air cushion. The thrust fan 84 is mounted for rotation in a substantially vertical plane in a duct 86. As in the case of the fan 28, the blades of the fan 84 may be of adustable pitch and therefore may be locked in any desired position. The fan 84 and the duct 86 are supported by a framework generally indicated at 88 affixed to the platform 22 in any convenient manner.

The duct may be of any desired cross-sectional shape, but for aerodynamic reasons, it is preferred that the duct has a broad front edge which tapers in the direction of motion of the air to the rear edge, as illustrated. Any desired material of construction may be employed such as fiberglass at the front edge and aluminium for the remainder.

A pair of rudder blades 90 and 91 are pivotally mounted to the duct 86 and may be moved to control the direction of flow of air from the fan 84 and hence the direction of movement of the vehicle 10. The blades 90 and 91 may be formed of any desired material, such as, aluminium.

The fan 84 is driven by engine 72 through drive shaft 92, clutch 94 and V-drive belts 96 connected between the power take off shaft of the engine 72 and a stub shaft air-intake The use of a single engine 72 to drive both the air-intake fan 28 and the thrust fan 84 represents a preferred embodiment of the invention and has certain advantages as indicated below when discussing the operation of the vehicle. If desired, two separate power plants may be used to drive the two fans.

In the cockpit 16 are positioned levers 100 and 102 which manually release and engage clutches 73 and 94. The clutches 73 and 94 may be released and engaged in any convenient manner.

Turning now to FIG. 5, there are shown the control of the butterfly valves 56, 58, 60 and 62, the control of the butterfly valves 68 and 70 and the control of the rudders 90 and 91.

Butterfly valves 56 and 58 are ganged together by connecting rod 104 which is rotatably secured to the platform 22, so that upon rotation of the rod 104, the position of both butterfly valves 56 and 58 may be simultaneously changed, to control the flow of air through its associated opening.

Similarly, butterfly valves 60 and 62 are ganged together by connecting rod 106, also rotatably secured to the platform 22. Upon rotation of the rod 106, the position of both butterfly valves 60 and 62 may be simultaneously varied.

A flange 108 is secured to the rod 104 and has attached thereto one end of an expansion spring 110 the other end of which is secured to a fixed point on the platform 22. The spring 110 urges the rod 104 to a butterfly valve-opening position. It will become apparent that it is possible to provide other means which will bias the butterfly valves towards an open at a closed position as desired.

Secured to the rod 106 is a flange 112 which has attached thereto one end of an expansion spring 114, the other end being secured to a fixed point on the platform 22. The spring 114 urges the rod 106 to a butterfly valve-opening position.

In normal operation, the rods 104 and 106 are positioned so that the butterfly valves are in a partially open position in their respective openings, whereby air may flow from the air pressure chamber 26 equally to the four sub-chambers below the platform 22.

The positioning of the rods 104 and 106, and hence of the butterfly valves, is controlled by control lever 82 which is pivotally mounted to the platform 22 through bracket 116 and pivot pin 118 for transverse motion in the cockpit 16. Affixed to the control lever 82 in any desired manner, such as by welding, is a cross-bar 120.

The extremities of the cross-bar 120 have affixed thereto one to each end one end of a pair of control wires 122 and 124.

Control wire 122 extends downwardly towards the platform 22, passes over a pulley 126, extends horizontally parallel to the platform 22, and around pulley 128, terminating at a bracket 130 secured to the rudder 90. The rudder 90 is mounted for rotation about a vertical axis.

Control wire 124 extends downwardly towards the platform 22, passes over a pulley 132, extends horizontally parallel to the platform 22, and around pulley 134, terminating at a bracket 136 secured to rudder 91, which is mounted for rotation about a vertical axis. The rudders 90 and 91 are tied by bar 138 for rotation in unison about the respective vertical axes.

Upon movement of the control lever 82 to the left the motion is transmitted through the wires 122 and 124 to the rudders 90 and 91 causing them to deflect to the left. Similarly upon displacement of the control lever 82 to the right, the rudders 90 and 91 are deflected to the right.

Along the length of the wire 122, there is joined thereto a further control wire 140, which passes around a pulley 142 and terminates at flange 112. Similarly a further control wire 144 is joined to the wire 124, passes around a pulley 146 and terminates at flange 108.

Therefore, upon movement of the control lever 82 to the left, not only are the rudders deflected to the left, the butterfly valves 56 and 58 open further while butterfly valves 60 and 62 close. Similarly, movement of the control lever 82 to the right causes the butterfly valves 56 and 58 to close while butterfly valves 60 and 62 open further.

The butterfly valves are normally positioned when the lever 82 is centrally located so that the associated openings are partially open, so that normally there is an equal air flow from the air chamber 26 to the sub-chambers below the platform 22. Typically, when the lever 82 is positioned at its central location, the control wires are dimensional to provide an approximately 45° inclination of each of the butterfly valves 56, 58, 60 and 62 with respect to the horizontal. When the lever 82 is moved to left or right, then the flow of air from the air chamber 26 to the sub-chamber is increased to the sub-chambers at one side while it is decreased to the sub-chambers at the other side.

The above-described control operation as shown in FIG. 5 therefore includes a single control lever 82 which controls both the positioning of the rudders and the flow of air to the sub-chambers. The manner in which this dual effect is achieved may be varied from that illustrated and any convenient manner of operation may be utilized.

The butterfly valves 68 and 70 are connected together by rod 148 which is affixed to the platform 22 for rotation. Midway along the length of the rod is affixed a flange 150 to which is attached one end of an expansion spring 152, the other end of which is fixed to the platform 22 in any convenient manner. The spring 152 serves to urge the butterfly valves 68 and 70 to the closed position. Normally the butterfly valves 68 and 70 are closed so that normally no air flows from the air chamber 26 to the front sub-chambers through the openings 62 and 64.

A lever 154 extends from the cockpit 76 to the flange 150 and allows the vehicle operator to rotate the rod 148 and hence open butterfly valves 68 and 70. When the valves 68 and 70 are open, more air flows into the front two sub-chambers than the rear two, so allowing the vehicle 10 to be reversed, as will be described later. Any other convenient reversing means may be adopted.

It is possible to employ other control means so that the flow of air through each of openings 48, 50, 52 and 54 may be controlled independently of each other. In this event, openings 62 and 64 may be eliminated, since it then is possible to selectively increase the flow of air to the front sub-chambers The construction shown, however, is preferred since in the absence of actuation of the butterfly valves 68 and 70, the flow of air to the two longitudinally adjacent sub-chambers is simultaneously controlled, thereby achieving a high degree of control over vehicle movements, as will become apparent below.

The canopy 14 also includes running lights 156 and marine lights, if required, (not shown). Such marine lights, when used, are mounted on the duct 86. Also included are cowled openings 158 to allow air to pass through the canopy to cool the engine 72.

To provide the necessary electric power to actuate the ignition of the engine 72 a conventional battery is used which is usually positioned behind the seat 78 within the cockpit 16.

The vehicle 10 when in the one-seater form illustrated and described above is capable of supporting a load of up to about 500 pounds and transport the load from place to place while being supported by a cushion of air. The power of the engine 72 and the size of the lift-fan 28 are among the factors which determine the load-carrying characteristics of the vehicle.

In operation, the engine 72 is started up in any convenient manner such as by an electric ignition system and upon engagement of clutch 73 by operation of lever 100 the fan 28 is actuated, causing air to be drawn through the screen 20 into the air chamber 26. The air in the chamber 26 is forced between the shell 12 and the platform 22 into the interior of the skirt 32. After the skirt 32 is fully inflated by the air, the air from the chamber 26 then passes through the openings 48, 50, 52 and 54 into the respective sub-chambers. The control lever 82 generally is positioned at a central location during this operation. A cushion of air therefore forms below the vehicle 10 and the vehicle is lifted clear of the sub-surface on the cushion, with air escaping from the gap between the skirt and the sub-surface while air is continuously fed to the cushion through the openings 48, 50, 52 and 54 to make up for the escaping gas. The cushion of air on which the vehicle 10 is supported therefore consists of a mass of constantly changing air, the volume of which below the vehicle is substantially constant.

The distance between the bottom of the skirt 32 and the sub-surface depends on the pressure of the air in the sub-chambers and hence the pressure in the cushion, which in turn depends on the speed of operation of the fan 28. The speed of the fan 28 is controlled from the engine 72 by the hand throttle control 84 on the lever 82. It is possible to position the engine throttle control at a different position within the cockpit 16, such as in the form of a foot operated pedal, as in an automobile. It is preferred to use a hand throttle, however, since then all of the controls of the vehicle 10, with the exception of the clutch levers 100 and 102, may be operated by one hand of the operator.

The openings 36 formed around the periphery of the bottom of the skirt 32 serve as pressure relief holes for the air in the skirt 32.

It will be apparent, therefore, that the skirt 32 serves to define with the platform 22 an air cushion. Since it is flexible, the possibility of structural damage to the vehicle by rough ground engaged by the skirt 32 during motion is reduced. Further, when the lift fan 28 is disengaged, and the air cushion thereby rapidly is dissipated, the skirt 32 cushions the sinking of vehicle 10 onto the sub-surface and thus reduces the possibility of damage to the vehicle and also the possibility of discomfort for the passenger.

The vehicle 10 therefore hovers on the cushion of air until the cushion is dissipated upon disengagement of the lift fan 28, or until movement is imparted to the vehicle.

To impart forward motion to the vehicle 10, while the vehicle is hovering on the air cushion formed in the manner described above, the clutch 94 is engaged by use of the actuating lever 102 and the thrust fan 84 thereby is operatively connected to the engine 72 and the operation of the fan 84 moves the vehicle over the sub-surface on the air cushion.

The vehicle 10 moves in a straight line path so long as the lever 82 is held in its central or neutral position and the speed of movement is determined by the positioning of the throttle 84.

The engine 72 in this embodiment therefore provides not only the power required to produce the air cushion on which the vehicle 10 rides but also the power required to impart motion to the vehicle.

As indicated above it is preferred that the engine 72 performs both of these functions and the primary reason for this is that if the engine 72 fails for any reason, then not only will the cushion collapse but no motive force is applied to the vehicle 10. In those cases where separate power plants are used for the lift fan 28 and the thrust fan 84, in the event of failure of the lift fan power plant, the thrust fan power plant usually still operates and upon collapse of the air cushion, the thrust may cause the vehicle to somersault, or otherwise crash, possibly causing extensive damage to the vehicle and injuring the passenger.

In order to turn the vehicle 10 to the left, the lever 82 is moved to the left. As observed above, movement of the lever 82 to the left causes the rudders 90 and 91 to be angled to the left. Left hand butterfly valves 56 and 58 at the same time are moved towards a closed position but remain partially open, the extent of the openners depending on the extent of movement of the lever 82, and right hand butterfly valves 60 and 62 are moved towards a more open position.

The movement of the butterfly valves has the effect of decreasing the amount of air passing through butterfly valves 56 and 58 while simultaneously increasing the amount of air passing through butterfly valves 60 and 62 by a corresponding amount. This results in a lifting of the right hand side of the vehicle while still supported on the air cushion beneath the vehicle which, combined with the deflection of the rudders 90 and 91 causes the vehicle 10 to move to the left. The angle of movement towards the left depends on the positioning of the rudders 90 and 91 and the butterfly valves, and hence on the position of the lever 82. The vehicle will continue to move to the left until the lever 82 is restored to the original central position, so that the butterfly valves and the rudders also are restored to their starting position. The vehicle 10 then moves in a straight line path until the position of the lever 82 again is changed.

For movement of the vehicle 10 to the right, the lever 82 is moved to the right. In this event, the rudders 90 and 91 are deflected to the right. Meanwhile, the right hand butterfly valves 60 and 62 move towards a closed position, while at the same time the left hand butterfly valves 56 and 58 move towards a more open position, the degree of movement of the valves depending on the extent of movement of the lever 82.

In this case, the amount of air passing through butterfly valves 56 and 58 is increased while simultaneously the amount of air passing through butterfly valves 60 and 62 is decreased by a corresponding amount. The left hand side of the vehicle 10 thereby is lifted while still supported on the air cushion beneath the vehicle, so that this effect combined with the deflection of the rudders 90 and 91 to the right causes the vehicle 10 to move to the right. The angle of movement to the right in this operation depends on the degree of movement of the lever 82 towards the right. This movement of the vehicle to the right continues until the lever 82 is restored to its original positon at which time the rudders and valves return to their original position and the vehicle 10 moves in a straight line path until the lever 82 again is moved.

Therefore, by utilizing a single engine 72 it is possible to provide both lift and forward thrust and by use of the control system described including a single lever it is possible to control forward and left and right hand movements of the vehicle in simple, safe and stable manner. Control systems may be included to otherwise control the height of the lift and the degree of forward thrust.

The vehicle 10 may be controlled to reverse and the backwards movement is achieved by disengaging the clutch 102 so that the thrust fan 84 no longer operates. Then, with the vehicle 10 still supported on the cushion of air, the lever 154 is acutated to open the butterfly valves 68 and 70. This has the effect of allowing more air to pass into the forward sub-chambers, which then are fed through openings 54, 62, 48 and 64, as compared to the rear sub-chambers which are continued to be fed only by openings 50 and 52. The front end of the vehicle 10 thereby is raised and, with the lever in the middle or neutral position, the vehicle slides backwards until the butterfly valves 68 and 70 are closed again by movement of the lever 154 and normal air flow to the sub-chambers is restored.

It is possible to achieve backwards movement to the left or right by appropriate positioning of the lever 82 while the butterfly valves 68 and 70 are in the open position, in analogous manner to that described above in connection with forward left and right hand movements.

The air cushion vehicle described above and constituting the subject of the present invention is stable, and readily and simply maneuverable, is adaptable to a plurality of payloads, has built-in safety features and in all respects operates satisfactorily as a small air cushion vehicle. While the principles disclosed and discussed above are particularly applicable to small air cushion vehicles, they may readily be adapted for use with large air cushion vehicles requiring to support large payloads.

Modifications are possible within the scope of the invention.

The embodiments of the invention in which an exclusive property or privilege is claimed are defined as follows:

1. An air cushion vehicle comprising a load-supporting platform situated substantially within a first plane, a depending flexible skirt associated with and surrounding said platform, first wall means depending from said platform and extending longitudinally of said platform, second wall means depending from said platform and extending laterally of said platform intersecting said first wall means, said first and second wall means defining with said skirt and said platform four sub-chambers on one side of said first plane, each of said sub-chambers being open at the side remote from said platform, said sub-chambers being out of fluid communicative relationship with each other other than through said open sides, an air chamber lcoated on the side of said first plane opposite to said one side and adapted to constitute a source of air pressure, feed means to force feed air to said chamber, said platform including four openings extending therethrough, each one of the openings establishing a fluid-flow relationship between said air chamber and one of said sub-chambers, whereby air may flow from said source of air pressure independently into each of said sub-chambers so that an air cushion may be established beneath said vehicle upon which said vehicle may be supported, the openings in said platform being constituted by two pairs of openings, each pair communicating with two longitudinally-aligned sub-chambers, valve means associated with each of the openings to control the fluid-flow relationship between said air chamber and each of said sub-chambers, said valve means being constituted by two pairs of valves connected to operate in unison, the pairs of valves being associated with the pairs of openings, valve operating means connected to each pair of valves for positioning each pair of valves responsive to positioning of said valve operating means, said valve operating means being adapted to position said pairs of valves to increase the volume of air passing from said source of air to one of said longitudinally-aligned pairs of sub-chambers while simultaneously decreasing the volume of air passing from said source of air pressure to the other of said longitudinally-aligned pairs of sub-chambers, and motion imparting means to propel the vehicle when supported on said air cushion.

2. The air cushion vehicle of claim 1, wherein the openings in said platform are circular and said valve means are butterfly valve means mounted in the circular openings.

3. The air cushion vehicle of claim 1, wherein said platform includes a further two openings, each one of the further openings establishing a further flow relationship between said air chamber and a pair of laterally aligned subchambers, and including a further pair of valve means associated with the further openings connected to operate in unison, and further valve operating means connected to said further pair of valve means for positioning said further pair of valve means responsive to positioning of said valve operating means, whereby the volume of air passing from said source of air to said pair of laterally aligned sub-chambers may be selectively increased by opening said further pair of valve means.

4. The air cushion vehicle of claim 1, wherein said feed means for said air chamber comprises first fan means mounted on said platform, and said motion imparting means comprises a second fan means mounted on superstructure associated with said platform with its rotors positioned for rotation in a second plane substantially perpendicular to said first plane, and including a power plant, first transmission means constituting a first torque delivery path between said power plant and said first fan means, first clutch means associated with said first transmission means for selectively establishing and disestablishing said first torque delivery path, second transmission means constituting a second torque delivery path between said power plant and said second fan means and second clutch means associated with said second transmission means for selectively establishing and disestablishing said second torque delivery path.

5. The air cushion vehicle of claim 4 including rudder means associated with said second fan means to direct the flow of air from said second fan means in a direction responsive to the positioning of said rudder means, and control means for positioning said rudder means.

6. The air cushion vehicle of claim 5 including an enclosure mounted on said platform on said other side of said first plane, said enclosure defining in part a cockpit area and enclosing said power plant, vent means in said enclosure associated with said feed means to allow air to be drawn through said enclosure to said air chamber, said cockpit area including said valve operating means, said further valve operating means and manual operating means to actuate said first and second clutch means.

7. The air cushion vehicle of claim 1 in which said skirt is inflatable and air is passed to said skirt from said air chamber to achieve and maintain the inflation.

8. A control system for an air cushion vehicle, said air cushion vehicle comprising a load supporting platform situated substantially within a first plane, a depending flexible skirt associated with and surrounding said platform, first wall means depending from said platform and extending longitudinally of said platform, second wall means depending from said platform and extending laterally of said platform intersecting said first wall means, said first and second wall means defining with said skirt and said platform four sub-chambers on one side of said first plane, each of said sub-chambers being open at the side remote from said platform, said sub-chambers being out of fluid flow communication with each other other than through said open sides, an air chamber located on the side of said first plane opposite to said one side and adapted to constitute a source of air pressure, feed means including a first fan means to force feed air to said chamber, said platform including four openings extending therethrough, each of the openings establishing a fluid flow relationship between said air chamber and one of said sub-chambers whereby air may flow from said source of air pressure independently into each of said sub-chambers so that an air cushion may be established beneath said vehicle upon which said vehicle may be supported, the openings being arranged in two pairs of longitudinally adjacent openings, and motion imparting means including a second fan means adapted to propel the vehicle when supported on said air cushion, said control system including first and second valve means located one in one member of one pair of longitudinally adjacent openings and the other in the other member of said one pair of longitudinally adjacent openings, said first and second valve means being connected for operation in unison, third and fourth valve means located one in one member of the other pair of longitudinally adjacent openings and the other in the other member of said other pair of longitudinally adjacent openings, said third and fourth valve means being connected for operation in unison, said valve means controlling the degree of fluid flow relationship between said air chamber and said sub-chambers, first and second rudder means associated with said second fan means to direct the passage of air flowing through said second fan means and joined together to move in unison a control lever mounted for pivotal movement, first and second control wires connecting to said control lever, said first control wire extending from said control lever to said first rudder in an operative manner to deflect said first rudder upon movement of said control lever, said second control wire extending from said control lever to said second rudder in operative manner to deflect said second rudder upon movement of said control lever, a third control wire extending from said first control wire to the said first and second valve means in operative manner to change the position of said first and second valve means upon movement of said control lever, and a fourth control wire extending from said second control wire to said third and fourth valve means in operative manner to change the position of said third and fourth valve means upon movement of said control lever, whereby said control lever postions said valve means and said rudders.

9. The control system of claim 8 wherein the openings in said platform are circular, said valve means are butterfly valves, said first and second valve means are joined together by a first rod mounted on said platform for rotational movement, said third and fourth valve means are joined together by a second rod mounted on said platform for rotational movement, and including first resilient means associated with said first rod to urge said first and second valve means to a fully open position, and second resilient means associated with said second rod to urge said second and third valve means to a fully open position, said third control wire being connected between said first control wire and said first resilient means, said fourth control wire being connected between said second control wire and said second resilient means, said valve means being held in a half open position by said control wires and said resilient means when said control lever is in a first position, while said rudders are held in a position corresponding to the direction of flow of the air through said second fan, said first and second valve means being moved towards a fully closed position and simultaneously said third and fourth valve means being moved towards a fully open position when said lever is moved in a first direction from said first position while said rudders are moved to a position to deflect the flow of air from said seond fan away from the side of the vehicle occupied by said first and second value means, and said first and second valve means being moved towards a fully open position and simultaneously said third and fourth valve means being moved towards a fully closed position when said control lever is moved in a second direction from said first position while said rudders are moved to a position to deflect the flow of air from said second fan away from the side of the vehicle occupied by said third and fourth valve means, whereby when said control lever is in said first position said air may flow from said source of air equally through the openings into said sub-chambers and when said second fan operates said vehicle moves in a rectilinear path, when said control lever is moved in said first direction from said first position air flows from said source of air preferentially through said third and fourth valve means thereby raising the side of the vehicle adjacent said third and fourth valve means and this action combined with the deflection of the rudders causes the vehicle to move in a curvilinear path in a direction away from the raised side, and when said control lever is moved in said second direction from said first position air flows from said source of air preferentially through said first and second valve means thereby raising the side of the vehicle adjacent said first and second valve means and this action combined with the deflection of the rudders causes the vehicle to move in a curvilinear path in a direction away from the raised side.

10. The control system of claim 9 wherein said platform includes two further circular openings formed towards the front of the vehicle, the further openings communicating with the laterally adjacent forward sub-chambers, fifth and sixth butterfly valves mounted one at each end of a third rod and postioned within the further openings, said third rod being mounted on said platform for rotational movement, and including third resilient means associated with said third rod to urge said fifth and sixth valves to a fully closed position and second lever means connected to said resilient means to rotate said rod against said resilient means to move said fifth and sixth valves towards an open position, whereby with said second fan inoperative, the flow of air from said source of air into the forward laterally aligned chambers is increased thereby raising the front of said vehicle with the result that the vehicle moves backwards until said second lever is released and said fifth and sixth valves close.

11. The control system of claim 9 wherein said control lever is an elongated lever pivotally mounted at one end to said platform for movement laterally of the vehicle, said first and second wires are attached adjacent opposite ends of a cross-bar affixed to said lever intermediate the ends thereof, said wires passing in substantially parallel relation downwardly from said cross-bar, around a first pair of pulleys and substantially parallel to said platform to a second pair of pulleys, said wires passing from said second pair of pulleys to said first and second rudders and crossing each other but out of contact with each other during said latter passing, said third wire being affixed to said first wire intermediate said first and second pair of pulleys, and passing angularly of said first wire to one of a third pair of pulleys, around said one pulley and then transverse of said platform crossing but out of engagement with said second wire to said first resilient means, said fourth wire being affixed to said second wire intermediate said first and second pair of pulleys and passing angularly of said second wire to the other of said third pair of pulleys, around said other pulley and then transverse of said platform crossing but out of engagement with said second wire to said second resilient means, whereby when said vehicle is supported on said air cushion and said second fan is operating, movement of said control lever to the left causes the vehicle to assume a curvilinear path to the left and movement of said control lever to the right causes the vehicle to assume a cirvilinear path to the right.

* * * * *